(12) United States Patent
Wu

(10) Patent No.: US 12,292,126 B2
(45) Date of Patent: May 6, 2025

(54) INFLATOR VALVE CONNECTOR

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 22 days.

(21) Appl. No.: 18/330,445

(22) Filed: Jun. 7, 2023

(65) Prior Publication Data

US 2024/0410482 A1 Dec. 12, 2024

(51) Int. Cl.
*F16K 15/20* (2006.01)
*F16K 27/04* (2006.01)
*F16K 31/60* (2006.01)
*F16K 35/02* (2006.01)

(52) U.S. Cl.
CPC ............ *F16K 15/20* (2013.01); *F16K 27/041* (2013.01); *F16K 31/60* (2013.01); *F16K 35/022* (2013.01); *F16K 35/025* (2013.01)

(58) Field of Classification Search
CPC ........ F16K 15/20; F16K 27/041; F16K 31/60; F16K 31/602; F16K 35/02; F16K 35/022; F16K 35/025; F16K 35/027; F04B 33/005; B60S 5/04; B60S 5/043; B60C 29/06; Y10T 137/3724
USPC ............. 141/38; 137/223, 231, 384.2–384.8; 417/374, 553, 510, 569, 460–469, 417/481–484, 486–488; 251/92–116, 251/279, 280
See application file for complete search history.

(56) References Cited

U.S. PATENT DOCUMENTS

| | | | | |
|---|---|---|---|---|
| 405,861 A * | 6/1889 | Wood | ...................... | F16K 35/02 251/295 |
| 428,031 A * | 5/1890 | Wood | ........................ | F16K 1/20 251/303 |
| 511,360 A * | 12/1893 | Reuter | .................. | F16K 35/025 251/109 |
| 557,943 A * | 4/1896 | Bayley et al. | ........ | F16K 35/025 403/324 |
| 919,019 A * | 4/1909 | Jakobson | .............. | F16K 35/025 251/109 |
| 927,308 A * | 7/1909 | Wilton | .................... | F16K 35/10 74/528 |
| 1,164,289 A * | 12/1915 | Knezek | ................. | F16K 35/025 251/109 |
| 1,303,178 A * | 5/1919 | Dunham | ................. | F16L 37/56 137/594 |
| 1,318,120 A * | 10/1919 | Wheaton | ............... | F16K 35/025 137/614.19 |
| 1,446,489 A * | 2/1923 | Vivarttas | ................. | F16L 37/05 285/346 |
| 2,038,508 A * | 4/1936 | Elliott | ...................... | F16N 5/02 251/114 |

(Continued)

Primary Examiner — Craig J Price
(74) Attorney, Agent, or Firm — Muncy, Geissler, Olds & Lowe, P.C.

(57) ABSTRACT

An inflator valve connector includes a housing, a holding device, an actuating lever, a limiting member and a biasing member. The housing has a containing hole, an air passage. The holding device includes at least one elastic airtight ring and a pushing member movably arranged in the containing hole. The actuating lever has a pivoting portion and a first engaging portion. The pivoting portion is configured to actuate the pushing member to directly or indirectly push the elastic airtight ring to elastically deform. The limiting member has a second engaging portion detachably engaged with the first engaging portion. The biasing member biases the limiting member.

10 Claims, 8 Drawing Sheets

(56) References Cited

U.S. PATENT DOCUMENTS

| | | | | |
|---|---|---|---|---|
| 2,147,287 A * | 2/1939 | Farmer | B60T 17/043 | 251/285 |
| 2,354,608 A * | 7/1944 | Orshansky, Jr. | F15B 13/02 | 74/532 |
| 2,362,946 A * | 11/1944 | Stockdale | B05B 9/01 | 239/480 |
| 2,519,283 A * | 8/1950 | Pulver | B05B 1/3431 | 239/443 |
| 2,722,397 A * | 11/1955 | Bruce | B64D 37/005 | 251/243 |
| 2,933,098 A * | 6/1960 | Lisiak | B60C 23/0496 | 251/243 |
| 3,022,015 A * | 2/1962 | Burch | B05B 1/1609 | 239/444 |
| 3,927,834 A * | 12/1975 | Tada | B05B 11/106 | 251/114 |
| 4,016,684 A * | 4/1977 | Urda | F16P 3/00 | 251/109 |
| 4,018,292 A * | 4/1977 | Roll | B25B 21/00 | 251/109 |
| 4,165,739 A * | 8/1979 | Doherty | A61M 5/30 | 604/68 |
| 4,193,320 A * | 3/1980 | Oota | F16K 1/221 | 251/95 |
| 4,254,667 A * | 3/1981 | Wong | G05G 1/04 | 251/109 |
| 4,276,898 A * | 7/1981 | Ross | B29C 73/166 | 137/315.04 |
| 4,747,427 A * | 5/1988 | Smith | F16K 5/0647 | 251/288 |
| 4,802,313 A * | 2/1989 | Smith | B24C 5/02 | 251/109 |
| 4,890,506 A * | 1/1990 | Muller | G05G 1/04 | 251/102 |
| 5,163,354 A * | 11/1992 | Bilodeau | B25F 5/00 | 91/428 |
| 5,435,703 A * | 7/1995 | Lin | F04B 33/005 | 417/521 |
| 5,598,724 A * | 2/1997 | Primeau | F16K 35/06 | 70/180 |
| 5,715,554 A * | 2/1998 | Downs | F04B 33/005 | 7/164 |
| 5,819,781 A * | 10/1998 | Wu | B60S 5/04 | 137/231 |
| 5,928,443 A * | 7/1999 | Jorda | B60C 29/064 | 152/415 |
| 5,975,109 A * | 11/1999 | Wu | B60S 5/04 | 137/231 |
| 6,032,922 A * | 3/2000 | Shew | F16K 31/52433 | 251/243 |
| 6,086,045 A * | 7/2000 | Moon | F16K 35/025 | 251/114 |
| 6,146,116 A * | 11/2000 | Wu | F04B 33/005 | 137/231 |
| 6,220,273 B1 * | 4/2001 | Wu | F04B 33/005 | 137/231 |
| 6,220,274 B1 * | 4/2001 | Wang | F16K 31/5245 | 251/102 |
| 6,220,568 B1 * | 4/2001 | Wu | B05B 12/0024 | 251/114 |
| 6,289,920 B1 * | 9/2001 | Wang | F16L 37/18 | 251/65 |
| 6,880,797 B2 * | 4/2005 | Yui | F16K 31/52 | 251/103 |
| 6,893,232 B2 * | 5/2005 | Wu | F04B 33/005 | 417/63 |
| 6,959,909 B2 * | 11/2005 | Bancroft | F16K 35/06 | 251/285 |
| 6,988,675 B2 * | 1/2006 | Hubmann | B05B 7/2443 | 239/398 |
| 7,862,065 B2 * | 1/2011 | Hawkins | B62J 11/02 | 280/288.4 |
| 7,866,335 B2 | 1/2011 | Wang | | |
| 8,156,955 B2 * | 4/2012 | Wang | F16K 15/20 | 137/231 |
| 8,317,574 B2 * | 11/2012 | Blickle | B27B 5/32 | 451/344 |
| 8,336,386 B2 * | 12/2012 | Wang | F04B 33/005 | 73/744 |
| 8,418,992 B2 * | 4/2013 | Meyer | F16K 41/103 | 251/102 |
| 8,424,555 B2 * | 4/2013 | Wu | F04B 33/005 | 137/231 |
| 8,424,781 B2 * | 4/2013 | Rosko | B05B 1/3013 | 239/528 |
| 8,720,475 B2 * | 5/2014 | Wu | F04B 33/005 | 137/271 |
| 8,727,306 B2 * | 5/2014 | Sisk | B60P 1/56 | 251/101 |
| 8,997,536 B2 * | 4/2015 | Fuller | E05B 13/002 | 70/180 |
| 9,206,916 B1 * | 12/2015 | Wang | F04B 33/00 | |
| 9,296,000 B1 * | 3/2016 | Laible | A01C 23/042 | |
| 9,328,834 B2 * | 5/2016 | Wang | F04B 33/005 | |
| 9,422,145 B2 * | 8/2016 | Wang | B67D 3/0029 | |
| 9,759,337 B2 * | 9/2017 | Cassiman | F16K 15/20 | |
| 9,989,180 B2 * | 6/2018 | Wang | B60S 5/04 | |
| 10,436,329 B2 * | 10/2019 | Suzuki | F16K 35/025 | |
| 11,168,678 B2 * | 11/2021 | Wu | F16K 15/20 | |
| 11,198,603 B1 * | 12/2021 | Shen | B67D 1/0887 | |
| 11,313,490 B2 * | 4/2022 | Vignerol | F16K 35/14 | |
| 11,644,119 B2 * | 5/2023 | Vignerol | F15B 20/00 | 251/251 |
| 11,927,308 B2 * | 3/2024 | Sellen | F16K 17/30 | |
| 12,117,097 B2 * | 10/2024 | Sellen | F16K 31/52408 | |
| 12,215,795 B2 * | 2/2025 | Wu | F16K 24/00 | |
| 2008/0128034 A1 * | 6/2008 | Fahl | F16L 37/44 | 137/614.06 |
| 2010/0258203 A1 * | 10/2010 | Meyer | F16K 41/103 | 251/109 |
| 2015/0316159 A1 * | 11/2015 | Wang | F16K 15/20 | 137/231 |
| 2016/0076662 A1 * | 3/2016 | Wang | F16K 15/20 | 137/231 |

\* cited by examiner

INFLATOR VALVE CONNECTOR

BACKGROUND OF THE INVENTION

The present invention relates to an inflator valve connector and, more particularly, to an inflator valve connector that can be operated with one hand.

U.S. Pat. No. 7,866,335 discloses an air valve connecting device includes a mouth attached to one end of a housing and having a compartment for engaging with a U.S. type valve, and having a bore for engaging with a French type valve, a barrel engaged onto the mouth, an actuator engaged in the housing and having a shank for engaging with the barrel for selectively receiving the French type valve, a tube engaged in the actuator for engaging with the French type valve, and the tube is extendible into the mouth for selectively engaging with the U.S. type valve, a handle includes a cam member for forcing the actuator to secure either the French type valve or the tube to the actuator, and for forcing the barrel and the mouth to engage with either the French type valve or the U.S. type valve.

However, when using the air valve connecting device, the air valve of the inflation object must be inserted into the mouth of the air valve connecting device first, and then the actuating handle is pulled up to force the mouth to clamp the air valve of the inflation object, so that it is quite inconvenient to use both hands for operating the air valve, the housing and the actuating handle.

Thus, a need exists for an inflator valve connector to mitigate and/or obviate the above disadvantages.

SUMMARY OF THE INVENTION

An objective of the present invention is to provide an inflator valve connector that includes a housing, a stopping portion, a holding device, an actuating lever, a limiting member and a biasing member. The housing defines a connecting end and an operating end, and the housing has a containing hole extending from the connecting end to the operating end, and an air passage communicating with the containing hole. The stopping portion is disposed at the connecting end. The holding device includes at least one elastic airtight ring and a pushing member movably arranged in the containing hole. The at least one elastic airtight ring is disposed between the stopping portion and the pushing member and configured to be directly or indirectly pushed by the pushing member to elastically deform for engaging an air valve. The actuating lever has a pivoting portion pivotally connected to the operating end, a handle portion opposite to the pivoting portion, and a first engaging portion. The pivoting portion is configured to actuate the pushing member to move and directly or indirectly push the at least one elastic airtight ring to elastically deform. The limiting member has an actuating portion and a second engaging portion detachably engaged with the first engaging portion. The biasing member is arranged between the limiting member and the housing to bias the limiting member.

In an embodiment, the housing further has a pivoting groove disposed at the operating end and communicating with the containing hole. The limiting member further has a limiting portion pivotally mounted to the pivoting groove. The second engaging portion is formed on the limiting portion. The actuating lever further has a trigger groove disposed on one side of the handle portion and faced to the actuating portion.

In an embodiment, the containing hole extends from the connecting end to the operating end along an axis. The pushing member is configured to be pushed by the pivoting portion and to move along the axis to directly or indirectly push the at least one elastic airtight ring, causing the at least one elastic airtight ring to elastically deform between a compressed state and a recovering state. When the second engaging portion of the limiting member engages with the first engaging portion of the actuating lever, the at least one elastic airtight ring is in the compressed state for engaging with the air valve. When the second engaging portion of the limiting member disengages from the first engaging portion of the actuating lever, the at least one elastic airtight ring is in the recovering state for directly or indirectly pushing the pushing member to move relative to the containing hole along the axis.

In an embodiment, the at least one elastic airtight ring defines a compressed length along the axis when in the compressed state, and the at least one elastic airtight ring defines a recovering length along the axis when in the recovering state. The recovering length is greater than the compressed length.

In an embodiment, one side of the pushing member adjacent to the operating end is provided with an abutted surface. The pivoting portion of the actuating lever has a first abutting surface and a second abutting surface. The first abutting surface and the second abutting surface selectively abut against the abutted surface as the actuating lever pivots relative to the pivoting groove.

In an embodiment, the first abutting surface and the second abutting surface are adjacent to each other and form an angle greater than 90 degrees.

In an embodiment, the inflator valve connector further includes a first pivoting member inserting through the pivoting portion. The first pivoting member defines a first distance from an axle center thereof to the first abutting surface and a second distance from the axle center thereof to the second abutting surface. The second distance is less than the first distance.

In an embodiment, the inflator valve connector further includes a second pivoting member inserting through the limiting portion. The limiting member is configured to be pivotable relative to the pivoting groove about an axle center of the second pivoting member between a first position and a second position, causing the second engaging portion of the limiting member to selectively engage with the first engaging portion of the actuating lever.

In an embodiment, the limiting member further has a positioning portion disposed at one side of the actuating portion. The positioning portion extends towards the pivoting groove. The biasing member is a compression spring. One end of the biasing member is connected to the positioning portion, and the other end of the biasing member abuts against a bottom face of the pivoting groove.

In an embodiment, the connecting end of the housing is threaded with a cap. The stopping portion is formed on the cap and extends inward toward the axis. The number of the at least one airtight ring is one. One end of the airtight ring abuts against the stopping portion, and the other end of the airtight ring abuts against the pushing member, allowing the airtight ring to be directly compressed by the pushing member to elastically deform for engaging the air valve.

In another embodiment, the biasing member is integrally formed with the limiting portion and extending towards the pivoting groove. The biasing member is capable of elastically pivoting relative to the limiting portion to bias the limiting member. The biasing member is provided with an abutting portion elastically abutting against a bottom surface of the pivoting groove.

In another embodiment, the housing is provided with a first threaded portion at the connecting end. The holding device further includes a casing, a first cover, a second cover, and a central tube. An outer periphery of the casing is provided with a second threaded portion and a third threaded portion. The second threaded portion and the third threaded portion are selectively threadedly engaged with the first threaded portion. The first cover is movably arranged within the casing. The stopping portion is formed in the first cover and extends inwardly towards the axis. The second cover is movably arranged within the casing. The central tube is movably arranged within the casing and disposed between the first cover and the second cover. The central tube is provided with a pushing portion for depressing a valve core of the air valve. The number of the at least one airtight ring is two. The two airtight rings are respectively disposed within the first cover and the second cover and elastically abut against the central tube. The pivoting portion of the actuating lever is configured to actuate the pushing member to push against the second cover, allowing the two airtight rings to be indirectly compressed by the pushing member to elastically deform for engaging the air valve.

The present invention will become clearer in light of the following detailed description of illustrative embodiments of this invention described in connection with the drawings.

DETAILED DESCRIPTION OF THE INVENTION

Figure 1:
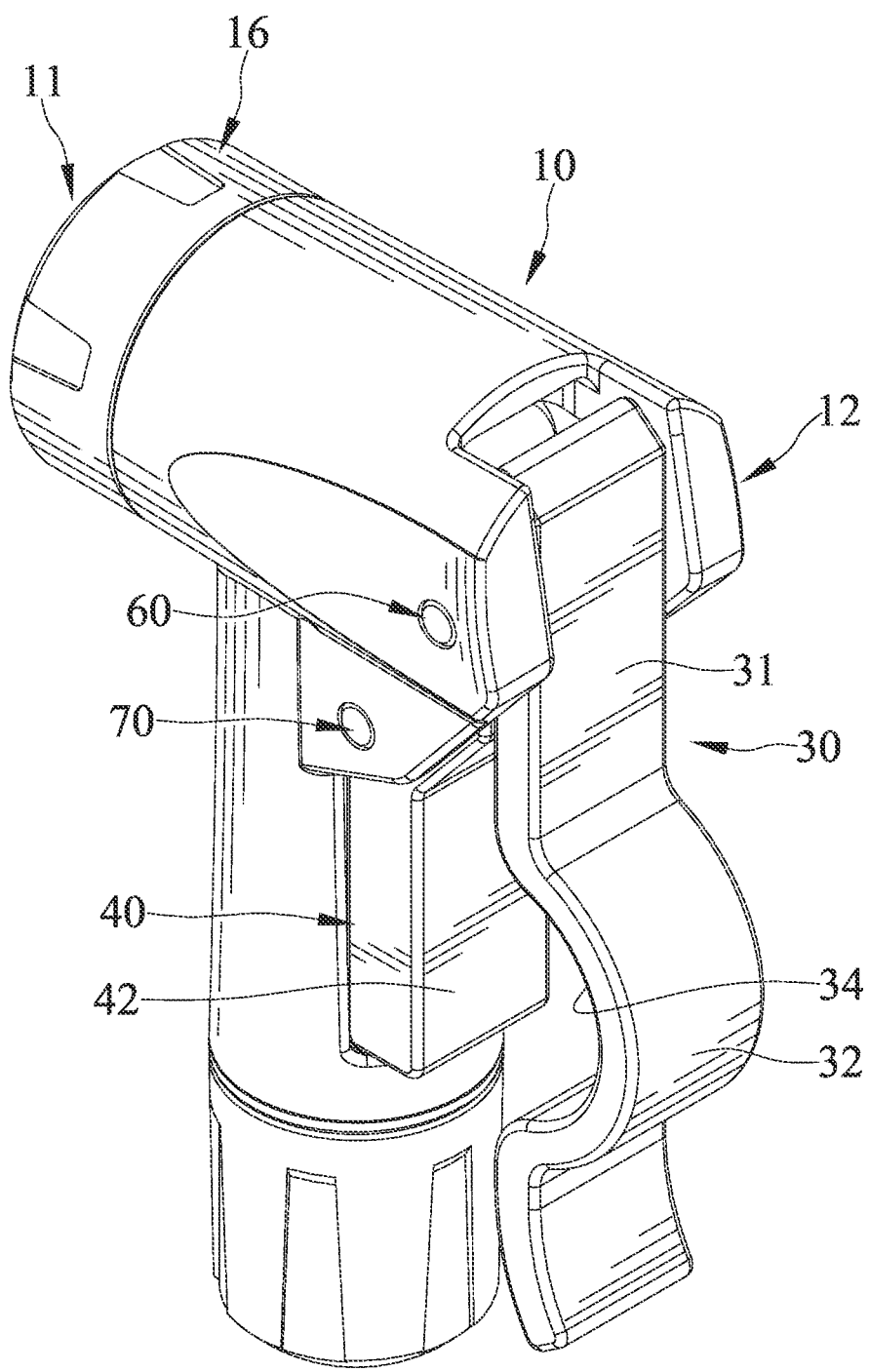
FIG. 1 is a perspective view of an inflator valve connector of a first embodiment according to the present invention.
Figure 2:
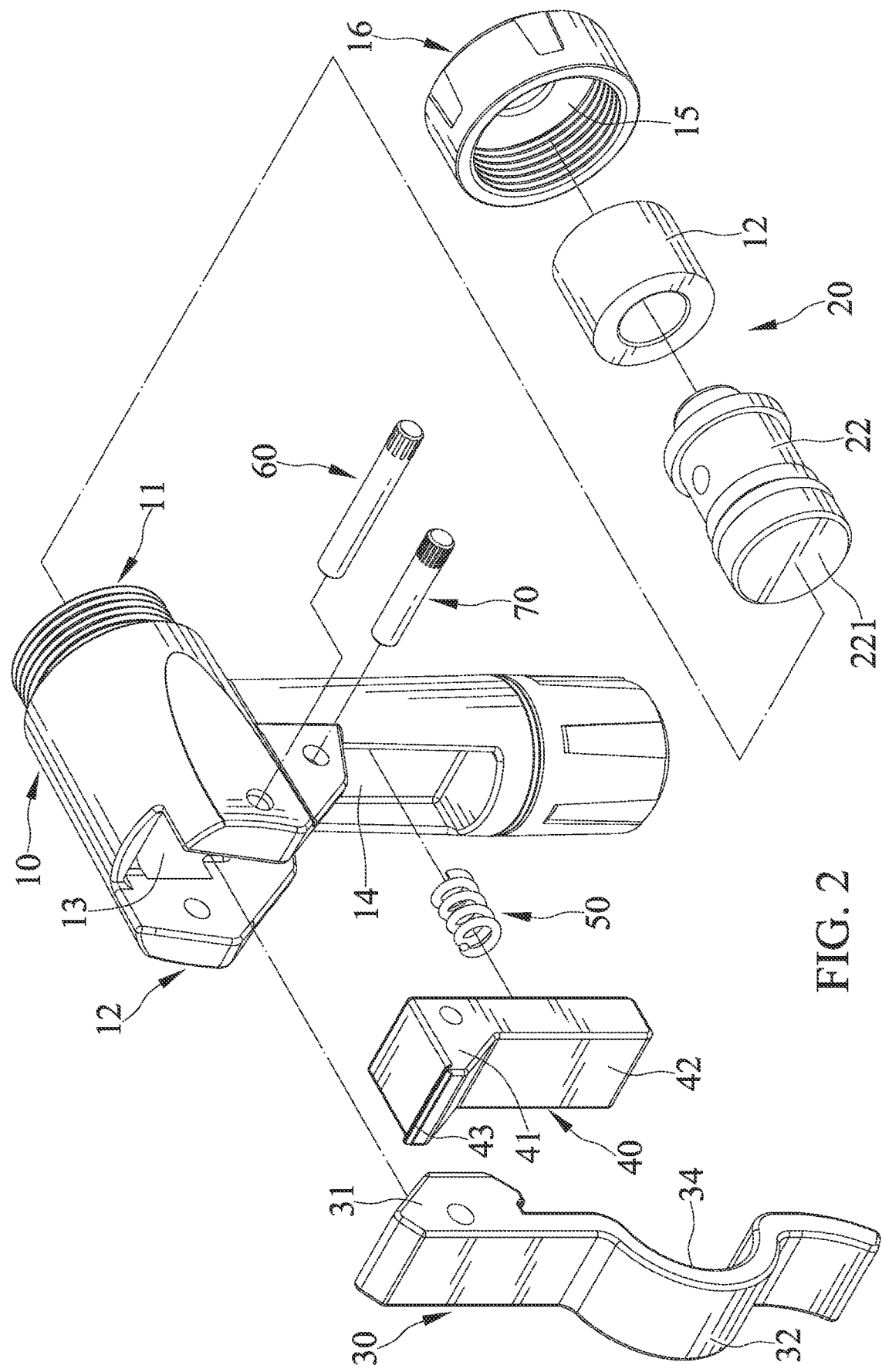
FIG. 2 is an exploded perspective view of the inflator valve connector of FIG. 1.
Figure 3:
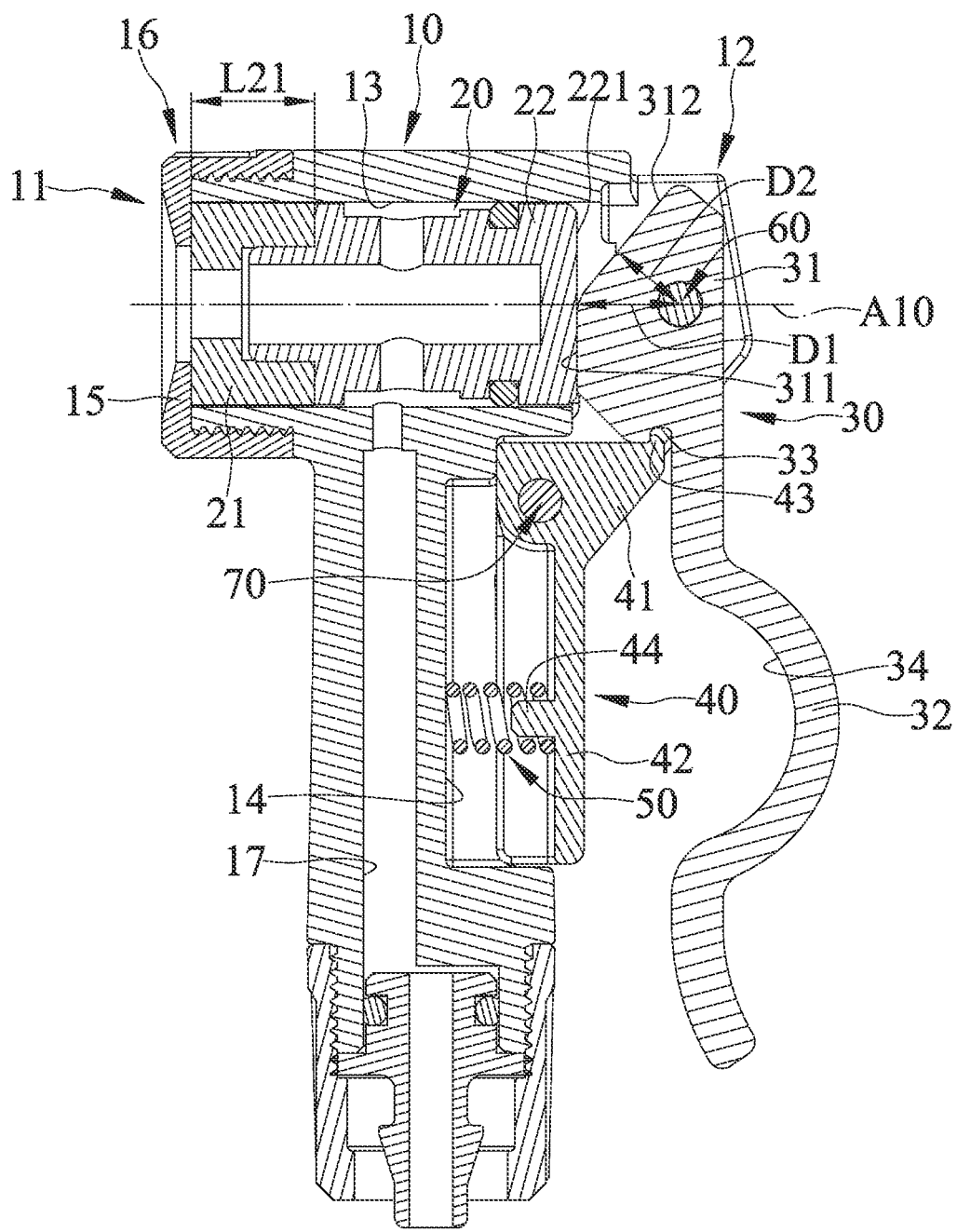
FIG. 3 is a cross sectional view of the inflator valve connector of FIG. 1 and shows an elastic airtight ring in a compressed state.
Figure 4:
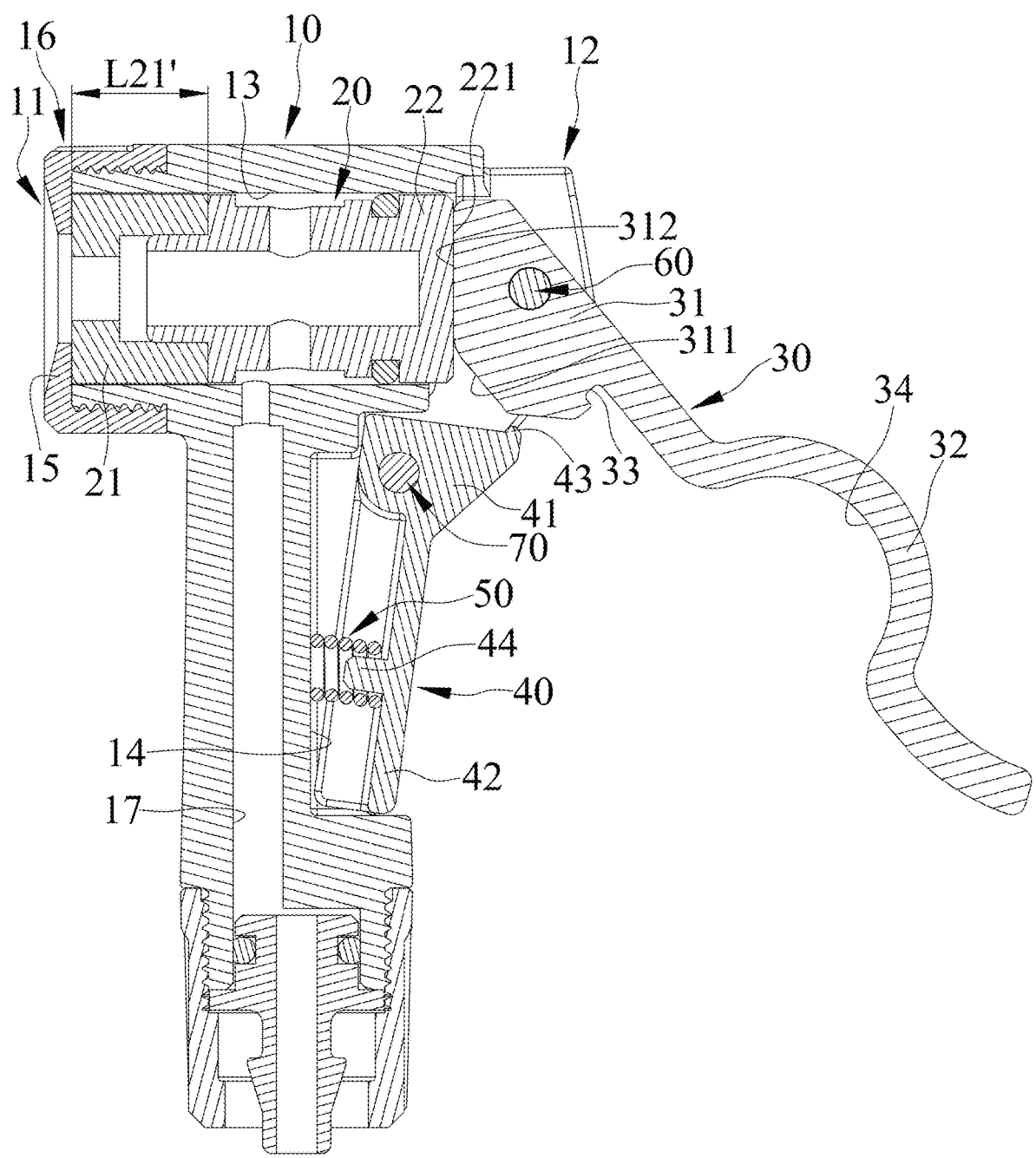
FIG. 4 is a continued view of FIG. 3 and shows the elastic airtight ring in a recovering state.
Figure 5:
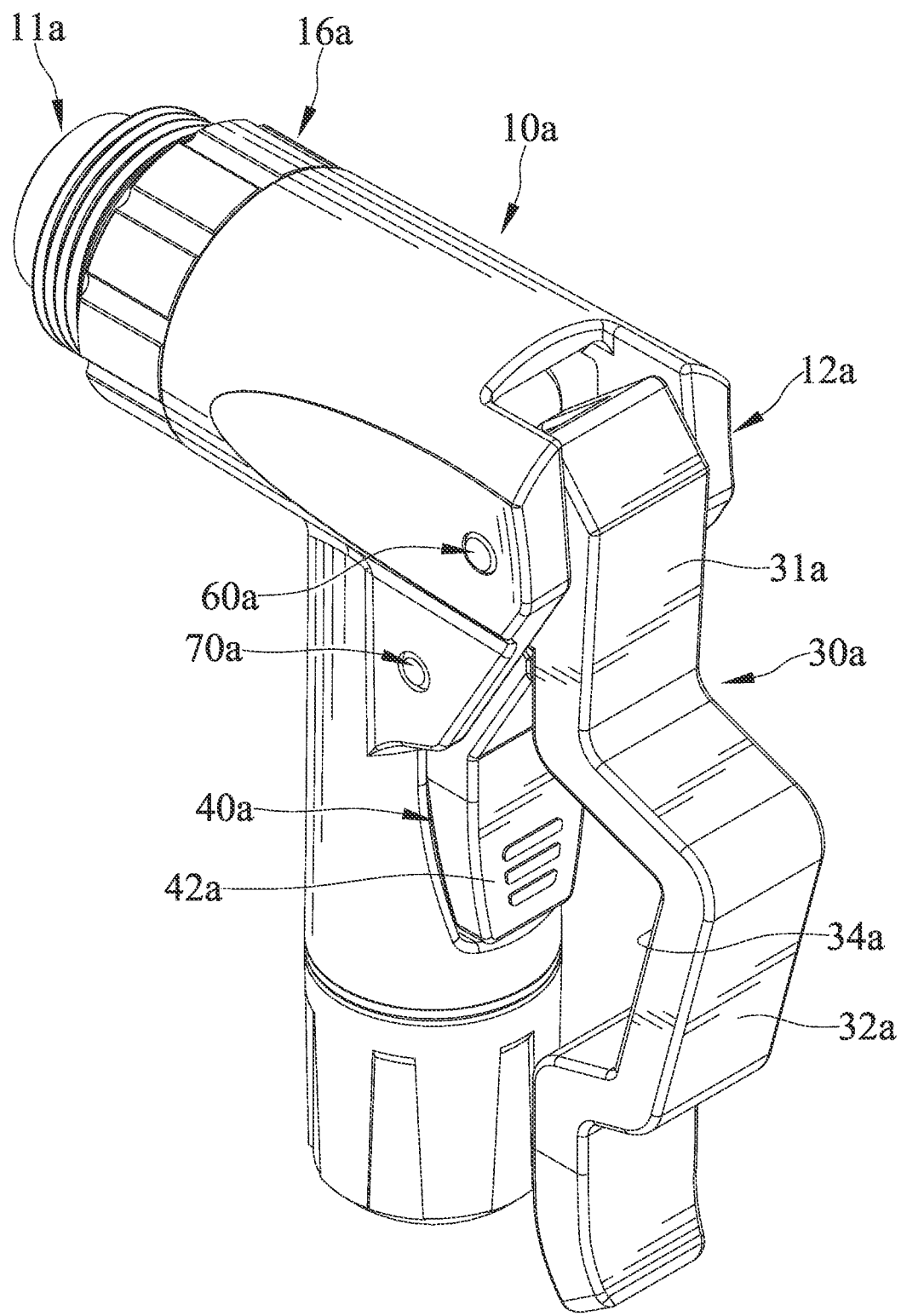
FIG. 5 is a perspective view of an inflator valve connector of a second embodiment according to the present invention.
Figure 6:
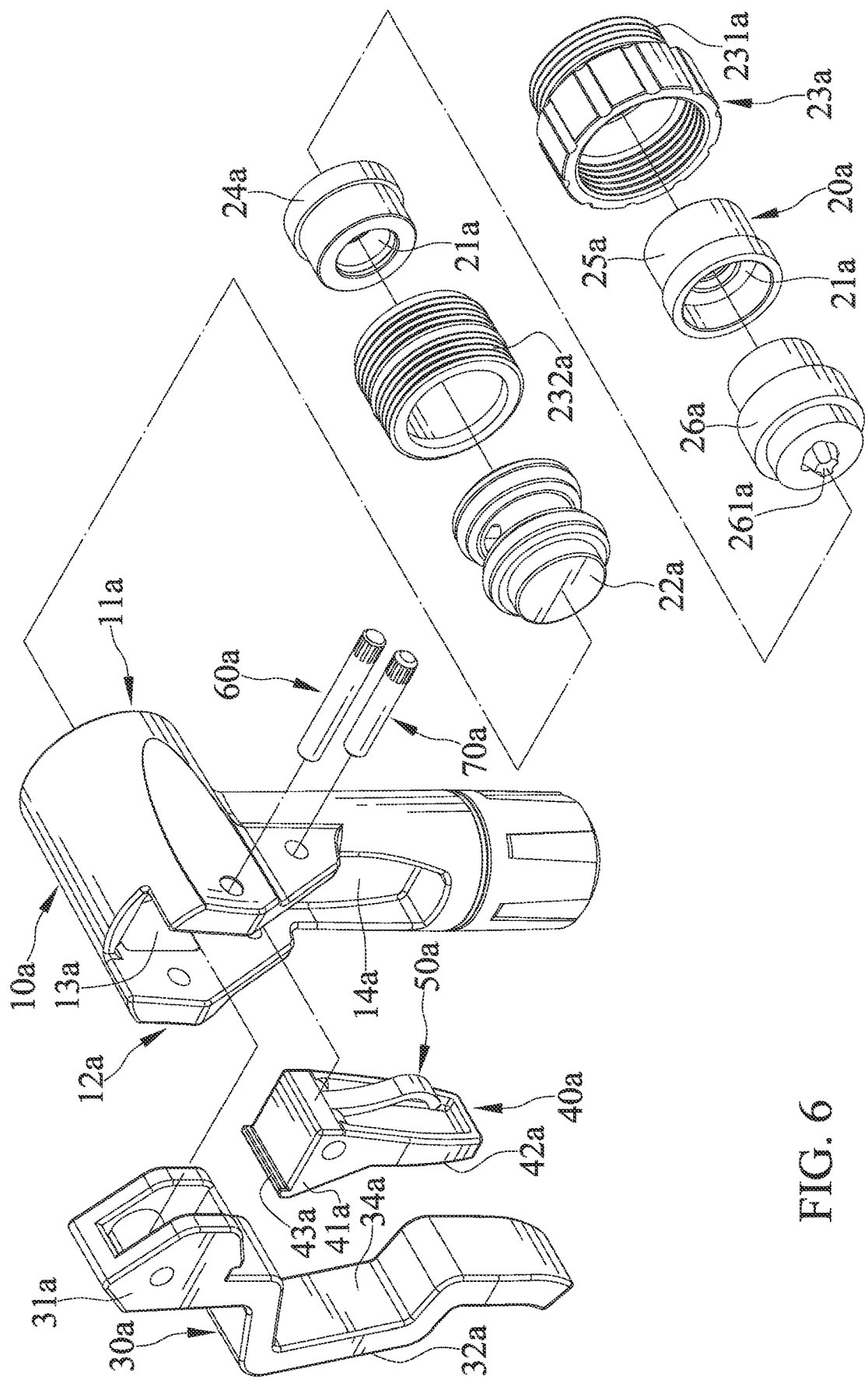
FIG. 6 is an exploded perspective view of the inflator valve connector of FIG. 5.

FIGS. 1-4 show an inflator valve connector of a first embodiment according to the present invention. The inflator valve connector of the first embodiment includes a housing 10, a holding device 20, an actuating lever 30, a limiting member 40 and a biasing member 50. The housing 10 defines a connecting end 11 and an operating end 12. The housing 10 has a containing hole 13 extending from the connecting end 11 to the operating end 12, an air passage 17 communicating with the containing hole 13, and a stopping portion 15 disposed at the connecting end 11. The holding device 20 is movably arranged in the containing hole 13 and includes an elastic airtight ring 21 and a pushing member 22. The elastic airtight ring 21 is disposed between the stopping portion 15 and the pushing member 22 and configured to be directly pushed by the pushing member 22 to elastically deform. The actuating lever 30 has a pivoting portion 31 pivotally connected to the operating end 12, a handle portion 32 opposite to the pivoting portion 31, and a first engaging portion 33. The pivoting portion 31 is configured to actuate the pushing member 22 to move and directly push the elastic airtight ring 21 to elastically deform. The limiting member 40 has an actuating portion 42 and a second engaging portion 43 detachably engaged with the first engaging portion 33. The biasing member 50 is disposed between the limiting member 40 and the housing 10 to bias the limiting member 40 being movable between a first position (FIG. 3) and a second position (FIG. 4).

Further, the containing hole 13 extends from the connecting end 11 to the operating end 12 along an axis A10. The pushing member 22 is configured to be pushed by the pivoting portion 31 and to move along the axis A10 to compress the elastic airtight ring 21, causing the elastic airtight ring 21 to elastically deform between a compressed state and a recovering state. When the limiting member 40 is in the first position, the second engaging portion 43 of the limiting member 40 engages with the first engaging portion 33 of the actuating lever 30, and the elastic airtight ring 21 is in the compressed state for engaging with an air valve (not shown). When the limiting member 40 is in the second position, the second engaging portion 43 of the limiting member 40 disengages from the first engaging portion 33 of the actuating lever 30, the elastic airtight ring 21 is in the recovering state for pushing the pushing member 22 to move relative to the containing hole 13 along the axis A10.

The housing 10 of the embodiment further has a pivoting groove 14 disposed at the operating end 12 and communicating with the containing hole 13. The limiting member 40 further has a limiting portion 41 pivotally mounted to the pivoting groove 14. The second engaging portion 43 is located on the limiting portion 41. The actuating lever 30 further has a trigger groove 34 disposed on one side of the handle portion 32 and faced to the actuating portion 42. Thus, the user's finger can reach into the trigger groove 34 and press the actuating portion 42 of the limiting member 40, causing the limiting member 40 to pivot relative to the pivoting groove 14, allowing the second engaging portion 43 of the limiting member 40 to disengage from the first engaging portion 33 of the actuating lever 30.

The limiting member 40 further has a positioning portion 44 disposed at one side of the actuating portion 42. The positioning portion 44 extends towards the pivoting groove 14. One end of the biasing member 50 is connected to the positioning portion 44, and the other end of the biasing member 50 abuts against a bottom face of the pivoting groove 14 to cause the biasing member 50 is normally biases against the limiting member 40. In order to change the position of the limiting member 40 relative to the pivoting groove 14 from the first position to the second position, the user must apply a force greater than a biasing force of the biasing member 50.

The elastic airtight ring 21 defines a compressed length L21 along the axis A10 when in the compressed state, and the elastic airtight ring 21 defines a recovering length L21' along the axis A10 when in the recovering state. The recovering length L21' is greater than the compressed length L21.

One side of the pushing member 22 adjacent to the operating end 12 is provided with an abutted surface 221. The pivoting portion 31 of the actuating lever 30 has a first abutting surface 311 and a second abutting surface 312. The first abutting surface 311 and the second abutting surface 312 selectively abut against the abutted surface 221. Further, the first abutting surface 311 and the second abutting surface 312 are adjacent to each other and form an angle greater than 90 degrees.

In the embodiment, the inflator valve connector further includes a first pivoting member 60 inserting through the pivoting portion 31. The first pivoting member 60 defines a first distance D1 from an axle center thereof to the first abutting surface 311 and a second distance D2 from the axle center thereof to the second abutting surface 312. The second distance D2 is less than the first distance D1.

The inflator valve connector further includes a second pivoting member 70 inserting through the limiting portion 41. The limiting member 40 is configured to be pivotable relative to the pivoting groove 14 about an axle center of the second pivoting member 70 between a first position and a second position to cause the second engaging portion 43 of the limiting member 40 to selectively engage with the first engaging portion 33 of the actuating lever 30.

The connecting end 11 of the housing 10 is threaded with a cap 16. The stopping portion 15 is formed on the cap 16 and extends inward toward the axis A10 to stop the elastic airtight ring 21.

As shown in FIG. 3, the limiting member 40 is in the first position, the second engaging portion 43 of the limiting member 40 engages with the first engaging portion 33 of the actuating lever 30. The first abutting surface 311 of the pivoting portion 31 of the actuating lever 30 abuts against the abutted surface 221 of the pushing member 22, causing the pushing member 22 moved along the axis A10 to force the elastic airtight ring 21, so that the elastic airtight ring 21 is elastically deformed to the compressed state for engaging the air valve.

As shown in FIG. 4, the user's finger can reach into the trigger groove 34 and press the actuating portion 42 of the limiting member 40. The biasing member 50 is compressed, and the limiting member 40 pivots relative to the pivoting groove 14, causing the limiting member 40 to switch from the first position to the second position. The second engaging portion 43 of the limiting member 40 disengages from the first engaging portion 33 of the actuating lever 30. At this time, the elastic airtight ring 21 recovers from the compressed state to the recovering state and pushes against the pushing member 22 to move relative to the containing hole 13 along the axis A10. The abutted surface 221 of the pushing member 22 pushes against the second abutting surface 312, causing the actuating lever 30 to pivot relative to the housing 10, allowing the air valve disengaged from the elastic airtight ring 21.

FIGS. 5-8 show an inflator valve connector of a second embodiment according to the present invention. The inflator valve connector of the second embodiment includes a housing 10a, a stopping portion 241a, a holding device 20a, an actuating lever 30a, a limiting member 40a and a biasing member 50a. The housing 10a defines a connecting end 11a and an operating end 12a, and the housing 10a has a containing hole 13a extending from the connecting end 11a to the operating end 12a, and an air passage 17a communicating with the containing hole 13a. The stopping portion 241a is disposed at the connecting end 11a. The holding device 20a includes at least one elastic airtight ring 21a and a pushing member 22 movably arranged in the containing hole 13a. The at least one elastic airtight ring 21a is disposed between the stopping portion 241a and the pushing member 22a and configured to be indirectly pushed by the pushing member 22a to elastically deform for engaging an air valve. The actuating lever 30a has a pivoting portion 31a pivotally connected to the operating end 12a, a handle portion 32a opposite to the pivoting portion 31a, and a first engaging portion 33a. The pivoting portion 31a is configured to actuate the pushing member 22a to move and indirectly push the at least one elastic airtight ring 21a to elastically deform. The limiting member 40a has an actuating portion 42a and a second engaging portion 43a detachably engaged with the first engaging portion 33a. The biasing member 50a is arranged between the limiting member 40a and the housing 10a to bias the limiting member 40a.

The housing 10a further has a pivoting groove 14a disposed at the operating end 12a and communicating with the containing hole 13a. The limiting member 40a further has a limiting portion 41a pivotally mounted to the pivoting groove 14a. Thus, the limiting member 40a is pivotable in relative to the pivoting groove 14a, and the second engaging portion 43a is formed on the limiting portion 41a. The actuating lever 30a further has a trigger groove 34a disposed on one side of the handle portion 32a and faced to the actuating portion 42a. Thus, the user's finger can reach into the trigger groove 34a and press the actuating portion 42a of the limiting member 40a, causing the limiting member 40a to pivot relative to the pivoting groove 14a, allowing the second engaging portion 43a of the limiting member 40a to disengage from the first engaging portion 33a of the actuating lever 30a.

Further, the containing hole 13a extends from the connecting end 11a to the operating end 12a along an axis A10. The pushing member 22a is configured to be pushed by the pivoting portion 31a and to move along the axis A10 to indirectly push the at least one elastic airtight ring 21a, causing the at least one elastic airtight ring 21a to elastically deform between a compressed state and a recovering state. When the second engaging portion 43a of the limiting member 40a engages with the first engaging portion 33a of the actuating lever 30a, the at least one elastic airtight ring 21a is in the compressed state for engaging with the air valve. When the second engaging portion 43a of the limiting member 40a disengages from the first engaging portion 33a of the actuating lever 30a, the at least one elastic airtight ring 21a is in the recovering state for indirectly pushing the pushing member 22a to move relative to the containing hole 13a along the axis A10.

The at least one elastic airtight ring 21a defines a compressed length L21 along the axis A10 when in the compressed state, and the at least one elastic airtight ring 21a defines a recovering length L21' along the axis A10 when in the recovering state, and the recovering length L21' is greater than the compressed length L21.

One side of the pushing member 22a adjacent to the operating end 12a is provided with an abutted surface 221a. The pivoting portion 31a of the actuating lever 30a has a first abutting surface 311a and a second abutting surface 312a. The first abutting surface 311a and the second abutting surface 312a selectively abut against the abutted surface 221a as the actuating lever 30a pivots relative to the pivoting groove 14a. Further, the first abutting surface 311a and the second abutting surface 312a are adjacent to each other and form an angle greater than 90 degrees.

In the embodiment, the inflator valve connector further includes a first pivoting member 60a inserting through the pivoting portion 31a. The first pivoting member 60a defines a first distance D1 from an axle center thereof to the first abutting surface 311a and a second distance D2 from the axle center thereof to the second abutting surface 312a. The second distance D2 is less than the first distance D1.

The inflator valve connector further includes a second pivoting member 70a inserting through the limiting portion 41a. The limiting member 40a is configured to be pivotable relative to the pivoting groove 14a about an axle center of the second pivoting member 70a between a first position and a second position to cause the second engaging portion 43a of the limiting member 40a to selectively engage with the first engaging portion 33a of the actuating lever 30a.

In the embodiment, the biasing member 50a is integrally formed with the limiting portion 41a as a monolithic component. Further, the biasing member 50a extends towards the pivoting groove 14a and can elastically pivot relative to the limiting portion 41a to bias the limiting member 40a. The biasing member 50a is provided with an abutting portion 51a elastically abutting against a bottom surface of the pivoting groove 14.

Furthermore, the housing 10a of the embodiment is provided with a first threaded portion 111a at the connecting end 11a. The holding device 20a of the embodiment further includes a casing 23a, a first cover 24a, a second cover 25a, and a central tube 26a. An outer periphery of the casing 23a is provided with a second threaded portion 231a and a third threaded portion 232a, and the second threaded portion 231a and the third threaded portion 232a are selectively threadedly engaged with the first threaded portion 111a. The first cover 24a is movably arranged within the casing 23a, and the stopping portion 241a is formed in the first cover 24a and extends inwardly towards the axis A10. The second cover 25a is movably arranged within the casing 23a. The central tube 26a is movably arranged within the casing 23a and disposed between the first cover 24a and the second cover 25a. The central tube 26a is provided with a pushing portion 261a for depressing a valve core of the air valve. The number of the at least one airtight ring 21a of the embodiment is two, and the two airtight rings 21a, 21a' are respectively disposed within the first cover 24a and the second cover 25a and elastically abut against the central tube 26a. The pivoting portion 31a of the actuating lever 30a is configured to actuate the pushing member 22a to push against the second cover 25a, allowing the two airtight rings 21a, 21a' to be indirectly compressed by the pushing member 22a to elastically deform for engaging the air valve.

Figure 7:
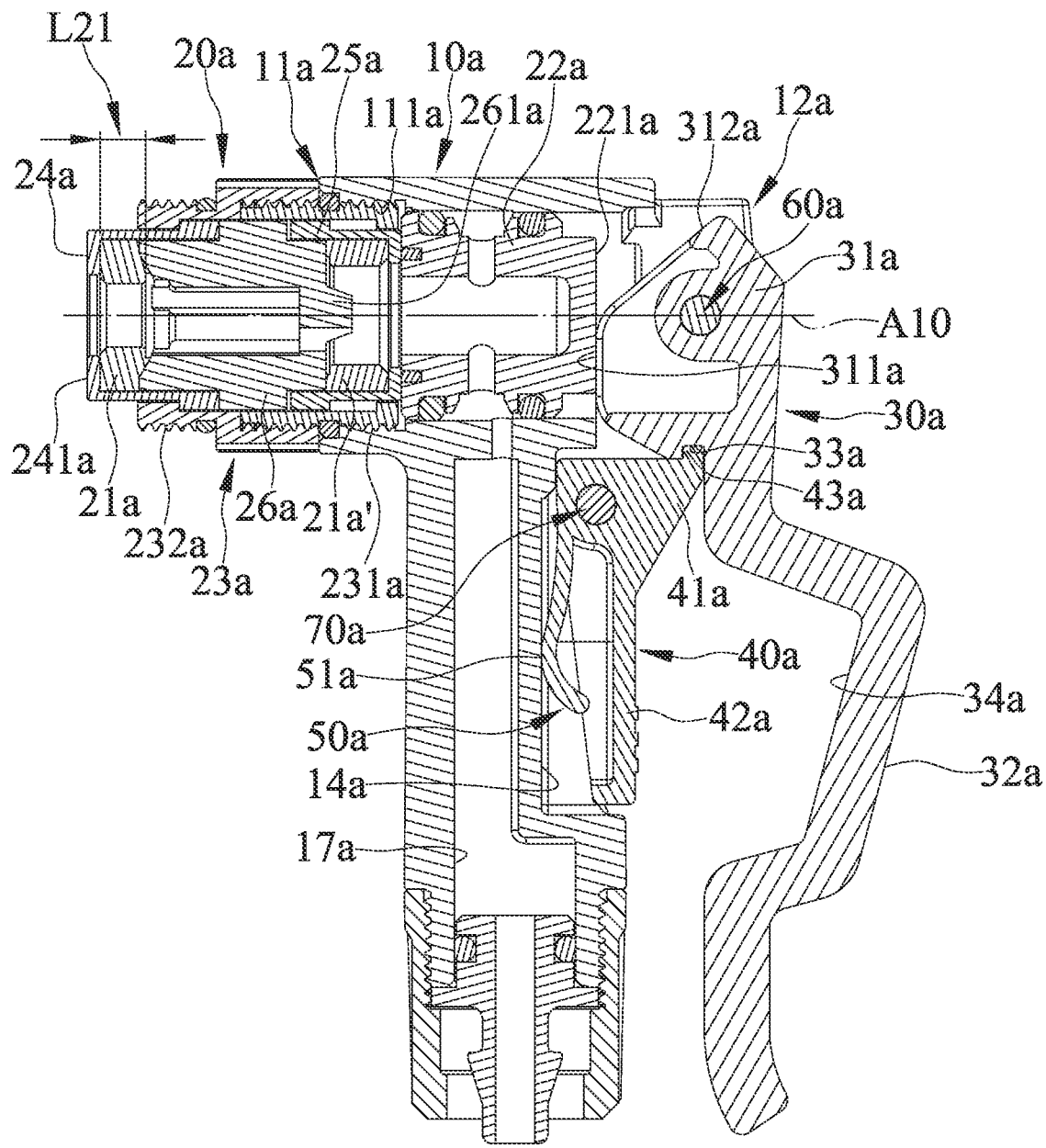
FIG. 7 is a cross sectional view of the inflator valve connector of FIG. 5 and shows an elastic airtight ring in a compressed state.

As shown in FIG. 7, the limiting member 40a is in the first position, the second engaging portion 43a of the limiting member 40a engages with the first engaging portion 33a of the actuating lever 30a. The first abutting surface 311a of the pivoting portion 31a of the actuating lever 30a abuts against the abutted surface 221a of the pushing member 22a, causing the pushing member 22a moved along the axis A10 to force the first cover 24a, the second cover 25a, the central tube 26a and the two airtight rings 21a, 21a', so that the elastic airtight ring 21a is elastically deformed to the compressed state for engaging the air valve.

Figure 8:
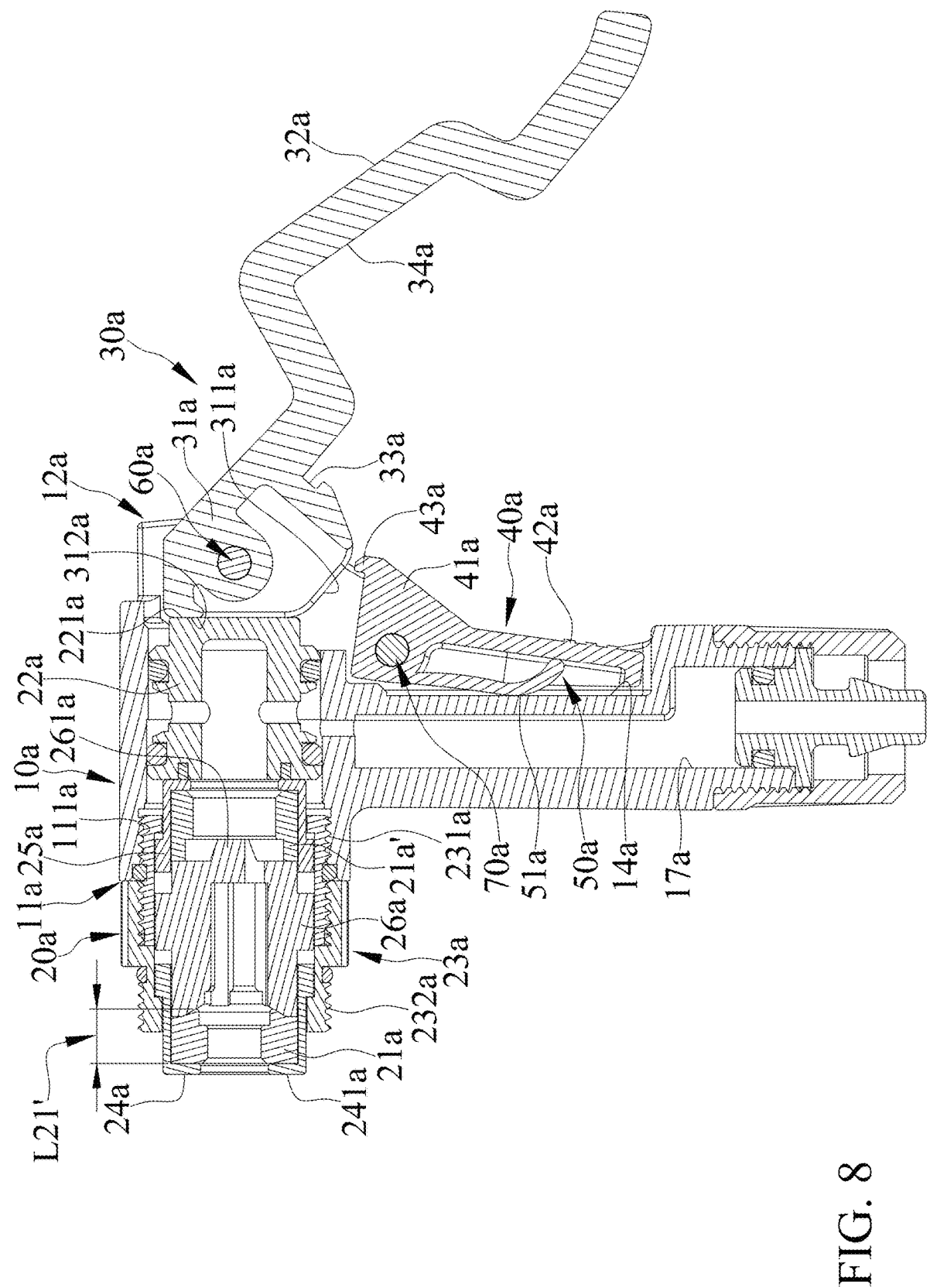
FIG. 8 is a continued view of FIG. 7 and shows the elastic airtight ring in a recovering state.

As shown in FIG. 8, the user's finger can reach into the trigger groove 34a and press the actuating portion 42a of the limiting member 40a. The biasing member 50a is compressed, and the limiting member 40a pivots relative to the pivoting groove 14a, causing the limiting member 40a to switch from the first position to the second position. The second engaging portion 43a of the limiting member 40a disengages from the first engaging portion 33a of the actuating lever 30a. At this time, the two elastic airtight rings 21a and 21a' recovers from the compressed state to the recovering state and indirectly pushes the pushing member 22a to move relative to the containing hole 13a along the axis A10. The abutted surface 221a of the pushing member 22a pushes against the second abutting surface 312a, causing the actuating lever 30a to pivot relative to the housing 10a, allowing the air valve disengaged from the elastic airtight ring 21a.

In summary, the inflator valve connector allows for the control of the engagement relationship between the first engaging portion 33; 33a of the actuating lever 30; 30a and the second engaging portion 43; 43a of the limiting member 40; 40a by simply pressing the limiting member 40; 40a with one hand to cause the elastic airtight ring 21; 21a switched between the compressed state and the restored state, allowing it to engage or disengage the air valve.

Although specific embodiments have been illustrated and described, numerous modifications and variations are still possible without departing from the scope of the invention. The scope of the invention is limited by the accompanying claims.

The invention claimed is:
1. An inflator valve connector comprising:
   a housing defining a connecting end and an operating end, wherein the housing has a containing hole extending from the connecting end to the operating end, an air passage communicating with the containing hole, and a pivoting groove disposed at the operating end and communicating with the containing hole;
   a stopping portion disposed at the connecting end;
   a holding device including at least one elastic airtight ring and a pushing member movably arranged in the containing hole, wherein the at least one elastic airtight ring is disposed between the stopping portion and the pushing member and configured to be directly or indirectly pushed by the pushing member to elastically deform for engaging an air valve;
   an actuating lever having a pivoting portion pivotally connected to the operating end, a handle portion opposite to the pivoting portion, and a first engaging portion, and wherein the pivoting portion is configured to actuate the pushing member to move and directly or indirectly push the at least one elastic airtight ring to elastically deform;
   a limiting member having an actuating portion, a second engaging portion detachably engaged with the first engaging portion, and a limiting portion pivotally mounted to the pivoting groove, and wherein the second engaging portion is formed on the limiting portion;
   a biasing member arranged between the limiting member and the housing to bias the limiting member;
   a first pivoting member inserting through the pivoting portion; and
   a second pivoting member inserting through the limiting portion, wherein the limiting member is configured to be pivotable relative to the pivoting groove about an axle center of the second pivoting member between a first position and a second position, causing the second engaging portion of the limiting member to selectively engage with the first engaging portion of the actuating lever;
   wherein the at least one elastic airtight ring is configured to elastically deform between a compressed state and a recovering state, wherein when the second engaging portion of the limiting member engages with the first engaging portion of the actuating lever, the at least one elastic airtight ring is in the compressed state for engaging with the air valve; and wherein when the second engaging portion of the limiting member disengages from the first engaging portion of the actuating lever, the at least one elastic airtight ring is in the recovering state for directly or indirectly pushing the pushing member to move relative to the containing hole.

2. The inflator valve connector as claimed in claim 1, and wherein the actuating lever further has a trigger groove disposed on one side of the handle portion and faced to the actuating portion.

3. The inflator valve connector as claimed in claim 2, wherein one side of the pushing member adjacent to the operating end is provided with an abutted surface, wherein the pivoting portion of the actuating lever has a first abutting surface and a second abutting surface, and wherein the first abutting surface and the second abutting surface selectively abut against the abutted surface as the actuating lever pivots relative to the pivoting groove.

4. The inflator valve connector as claimed in claim 3, wherein the first abutting surface and the second abutting surface are adjacent to each other and form an angle greater than 90 degrees.

5. The inflator valve connector as claimed in claim 3, wherein the first pivoting member defines a first distance from an axle center thereof to the first abutting surface and a second distance from the axle center thereof to the second abutting surface, and wherein the second distance is less than the first distance.

6. The inflator valve connector as claimed in claim 2, wherein the limiting member further has a positioning portion disposed at one side of the actuating portion, wherein the positioning portion extends towards the pivoting groove, wherein the biasing member is a compression spring, and wherein one end of the biasing member is connected to the positioning portion, and the other end of the biasing member abuts against a bottom face of the pivoting groove.

7. The inflator valve connector as claimed in claim 1, wherein the at least one elastic airtight ring defines a compressed length along the axis when in the compressed state, and the at least one elastic airtight ring defines a recovering length along the axis when in the recovering state, and wherein the recovering length is greater than the compressed length.

8. The inflator valve connector as claimed in claim 1, wherein the connecting end of the housing is threaded with a cap, wherein the stopping portion is formed on the cap and extends inward toward the axis, wherein the number of the at least one airtight ring is one, wherein one end of the airtight ring abuts against the stopping portion, and the other end of the airtight ring abuts against the pushing member, allowing the airtight ring to be directly compressed by the pushing member to elastically deform for engaging the air valve.

9. The inflator valve connector as claimed in claim 1, wherein the biasing member is integrally formed with the limiting portion and extending towards the pivoting groove, wherein the biasing member is capable of elastically pivoting relative to the limiting portion to bias the limiting member, and wherein the biasing member is provided with an abutting portion elastically abutting against a bottom surface of the pivoting groove.

10. The inflator valve connector as claimed in claim 1, wherein the housing is provided with a first threaded portion at the connecting end, wherein the holding device further includes a casing, a first cover, a second cover, and a central tube, wherein an outer periphery of the casing is provided with a second threaded portion and a third threaded portion, wherein the second threaded portion and the third threaded portion are selectively threadedly engaged with the first threaded portion, wherein the first cover is movably arranged within the casing, wherein the stopping portion is formed in the first cover and extends inwardly towards the axis, wherein the second cover is movably arranged within the casing, wherein the central tube is movably arranged within the casing and disposed between the first cover and the second cover, wherein the central tube is provided with a pushing portion for depressing a valve core of the air valve, wherein the number of the at least one airtight ring is two, wherein the two airtight rings are respectively disposed within the first cover and the second cover and elastically abut against the central tube, and wherein the pivoting portion of the actuating lever is configured to actuate the pushing member to push against the second cover, allowing the two airtight rings to be indirectly compressed by the pushing member to elastically deform for engaging the air valve.

* * * * *